United States Patent [19]

Tsunekawa

[11] Patent Number: 4,704,024

[45] Date of Patent: Nov. 3, 1987

[54] PHOTOMETRIC CIRCUIT FOR CAMERA

[75] Inventor: Tokuichi Tsunekawa, Kanagawa, Japan

[73] Assignee: Canon Kabushiki Kaisha

[21] Appl. No.: 678,636

[22] Filed: Dec. 6, 1984

[30] Foreign Application Priority Data

Dec. 9, 1983 [JP] Japan .............................. 58-233160
Dec. 9, 1983 [JP] Japan .............................. 58-233161

[51] Int. Cl.$^4$ .................... G03B 7/08; G01J 1/42; H01J 40/02; H01L 31/02
[52] U.S. Cl. .................................. 354/432; 356/222; 250/211 J; 250/214 P; 250/209; 357/30
[58] Field of Search ................ 354/429-432, 354/465; 356/221, 222; 250/214 P, 209, 211 R, 211 J, 578; 357/30, 30 D, 30 H

[56] References Cited

U.S. PATENT DOCUMENTS

| | | | |
|---|---|---|---|
| 3,450,016 | 6/1969 | Yamada | 354/432 |
| 3,473,453 | 10/1969 | Gross | 354/432 |
| 3,762,294 | 10/1973 | Kosaka et al. | 354/465 X |
| 4,218,623 | 8/1980 | Utagawa | 250/578 |
| 4,320,948 | 3/1982 | Hosoe et al. | 354/432 X |
| 4,364,650 | 12/1982 | Terashita et al. | 354/432 |
| 4,420,252 | 12/1983 | Nakauchi | 354/432 X |

Primary Examiner—W. B. Perkey
Attorney, Agent, or Firm—Toren, McGeady & Associates

[57] ABSTRACT

A photometric circuit for a camera has a photo-electric conversion element arranged to measure light in the middle part of the angle of view of the camera and a plurality of photo-electric conversion elements arranged to measure light in the peripheral parts of the angle of view. Of these peripheral light measuring elements, the elements disposed symmetrically with each other relative to the middle part of the angle of view are paired and connected in series with each other. Further, the series circuits thus formed are connected in parallel with the middle light measuring element.

9 Claims, 16 Drawing Figures

PHOTOMETRIC CIRCUIT FOR CAMERA

BACKGROUND OF THE INVENTION

1. Field of the Invention

This invention relates to a photometric circuit adapted for exposure control of a camera.

2. Description of the Prior Art

Figure 1:
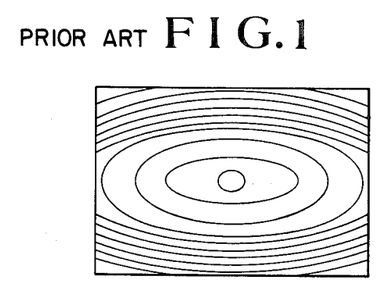
FIG. 1 is an illustration of the sensitivity distribution of the conventional photometric circuit.

The conventional cameras have been generally provided with a photometric circuit which is arranged to measure light with importance set on the middle part of the angle of view of the camera, because such center preponderant photometry has a high degree of probability of giving an appositely exposed picture. Referring to FIG. 1 of the accompanying drawings, the photometric circuit of the conventional camera thus gives an output corresponding to an averaged value with the middle part having a greater weight. However, in the event of a picture plane having a SKY as an object to be photographed in a large portion thereof, a back-light object or a greatly varied brightness in part, it is often hardly possible to obtain an apposite exposure with a camera of the conventional center preponderant photometric type.

Therefore, in a known prior art photometric method for solving this problem, the picture plane is divided into a middle part and four peripheral parts which are on the upper, lower, left and right sides of the middle part; the values of light of these parts are measured independently of each other; from five light measurement values thus obtained, parameters of differences among a maximum value, an averaged value, and a center preponderant average value are computed; then, a center preponderant photometric mode, a high measured value preponderant mode, an averaging mode or a low measured value preponderant mode is selected; and automatic exposure control is carried out on the basis of a light measurement value obtained by performing light measurement in the selected photometric mode. However, this method necessitates circuit arrangement in a large scale as it requires to carry out light measurement for each of the five divided parts of a picture plane; and then to carry out a complex information processing operation on the measured values as mentioned above. This has been a drawback of this method.

Meanwhile, U.S. Pat. No. 3,884,584 has disclosed a method, wherein: A photometric element which measures light for the middle part of a picture plane and another photometric element which measures light for a peripheral part of the picture plane are series connected with each other. A series circuit thus formed is connected between an inversion input terminal and a non-inversion input terminal of an operational amplifier. A feedback loop is arranged between the output terminal and the inversion input terminal of the operational amplifier. The output of the operational amplifier is thus controlled to be of a value corresponding to a smaller one of currents produced from the two series connected elements. However, since light is measured for a middle part and a peripheral part of a picture plane which is simply divided with two photometric elements connected in series with each other in this case, if the upper half portion of the picture plane is occupiled by the sky and the lower half portion is occupied by a principal object, for example, the light of the sky is incident on these elements. In that event, the outputs of these elements depend on the intensity of the light from the sky. Therefore, in case an automatic exposure control is performed on the basis of the outputs of these elements, the principal object will have an under-exposure, thus failing to have a proper exposure.

SUMMARY OF THE INVENTION

It is a general object of this invention to provide a photometric circuit which solves the above-stated problems of the prior art methods with simple circuit arrangement and is capable of ensuring an apposite exposure even in such cases where a large portion of a picture plane is occupied by a sky as an object to be photographed and where a picture plane has a back-light object.

It is a more specific object of this invention to provide a photometric circuit wherein: There are provided a photovoltaic type photo-electric conversion element for measuring light in the middle part of a picture plane and a plurality of photovoltaic type photo-electric conversion elements for measuring light of the peripheral parts of the picture plane. Among the peripheral light measuring elements, the elements disposed symmetrically with each other relative to the middle part of the picture plane are paired and connected in series with each other. Further, the series circuits thus formed are connected in parallel with the middle light measuring element.

These and further objects and features of this invention will become apparent from the following detailed description of preferred embodiments thereof taken in connection with the accompanying drawings.

DETAILED DESCRIPTION OF THE PREFERRED EMBODIMENTS

Figure 2:
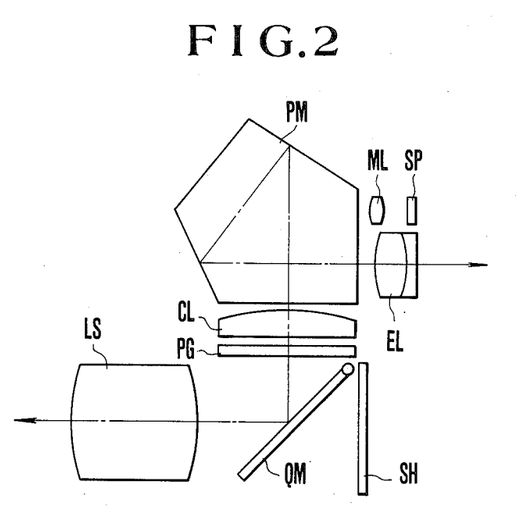
FIG. 2 is a schematic illustration showing the arrangement of the optical system of a camera to which this invention is applied as an embodiment thereof.

FIG. 2 shows the optical arrangement of a single-lens reflex camera. The illustration includes a photo-taking lens LS; a quick return mirror QM; a focusing plate PG; a condenser lens CL; a pentagonal prism PM; an eyepiece lens EL; a condenser lens ML for light measurement; a photo-electric conversion part SP for light measurement; and a shutter SH. An image of an object to be photographed is arranged to be formed approximately on the photo-electric conversion part SP coming via the photometric condenser lens ML.

Figure 3A:
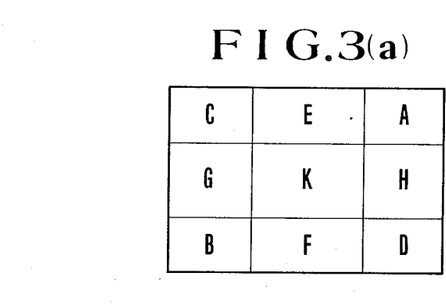
FIGS. 3(a) and 3(b) and 4 show an embodiment of the invention, FIG. 3(a) showing the details of a photo-electric conversion part shown in FIG. 2, FIG. 3(b) showing the same conversion part as in a vertical posture and FIG. 4 showing a photometric circuit using the photo-electric conversion part shown in FIG. 3(b).
Figure 3B:
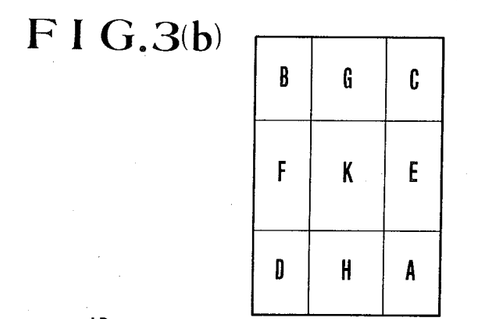

FIGS. 3(a) and 3(b) are plan views showing the details of the photo-electric conversion part SP of FIG. 2. The conversion part SP is divided into nine parts including a middle element K and peripheral elements A–H of a picture plane. FIG. 3(a) shows the photo-electric conversion part SP as in a lateral posture state and FIG. 3(b) shows it as in a vertical posture. With the camera set in a lateral position or posture, the elements A, E and C receive a sky light as shown in FIG. 3(a). With the camera set in a longitudinal posture, it is the elements B, G and C that receive the sky light.

Figure 4:
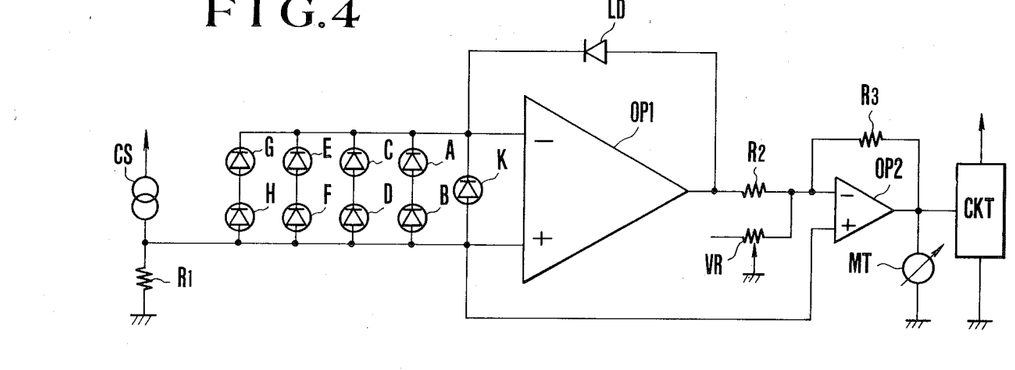

FIG. 4 shows a photometric circuit arranged for the above-stated photo-electric conversion part SP. The photometric circuit includes an operational amplifier OP1. To the non-inversion input terminal of this operational amplifier OP1 is connected a node between a constant current source CS and a resistor R1 which are series connected to each other. Each of pairs of elements A and B, C and D, E and F and G and H which are symmetrically arranged with reference to the middle element K are series connected with each other. The series circuits thus formed by these pairs of elements are connected in parallel between the input terminals of the operational amplifier OP1. Meanwhile, the middle element K is also connected between the input terminals of the operational amplifier OP1. A logarithmic compression element LD is connected between the input and output terminals of the operational amplifier OP1. Another operational amplifier OP2 has a feedback resistor R3 connected between the input and output terminals thereof and is provided for computation. The output terminal of the operational amplifier OP1 is connected via a resistor R2 to the inversion input terminal of the operational amplifier OP2. A resistor VR for exposure information is also connected to the inversion input terminal of the amplifier OP2. The output of the operational amplifier OP2 is arranged to be applied to an indicating or display means MT such as an ampere meter or the like and also to an exposure control circuit CKT.

The photometric circuit operates as follows: A bias voltage is impressed on the non-inversion input terminal of the photometric operational amplifier OP1 of high input impedance from the constant current source CS and the resistor R1. Then, the photo-electric conversion elements K and A – H begin to operate in a current mode. A photo current produced from these elements is logarithmically compressed by the logarithmic compression element LD and then is subjected to computation with exposure information VR at the computing circuit which consists of the resistors R2 and R3 and the operational amplifier OP2. The operational amplifier OP2 then produces information on the shutter time or the aperture. The output of the amplifier OP2 is displayed by the indicating means MT such as an ampere meter. Meanwhile, the exposure operation of the camera is controlled through the known exposure control circuit CKT.

Figure 5A:
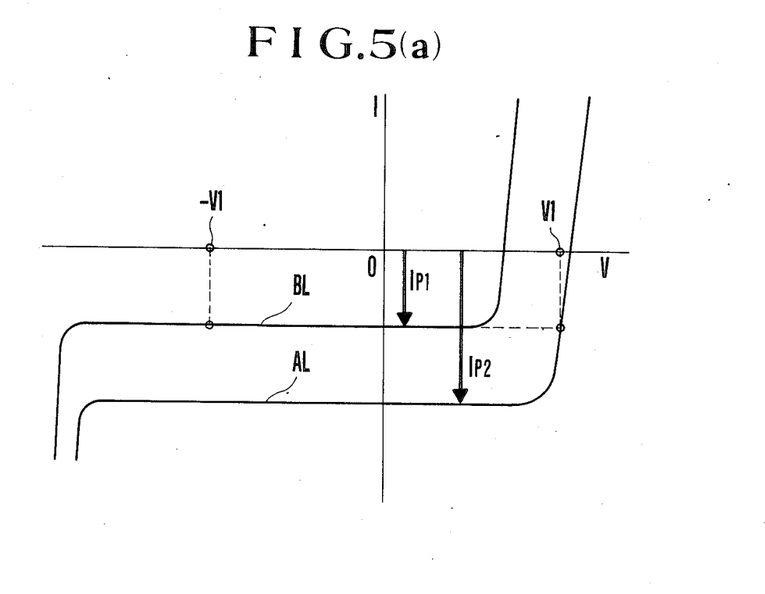
FIGS. 5(a), 5(b), 6(a) and 6(b) are illustrations of the operation of the photometric circuit shown in FIG. 4, FIGS. 5(a) and 5(b) showing the photometric circuit as in a state of having a more amount of light incident on an element A than on another element B, and FIGS. 6(a) and 6(b) showing the circuit as in a state of having a more amount of light incident on the element B than on the element A.
Figure 5B:
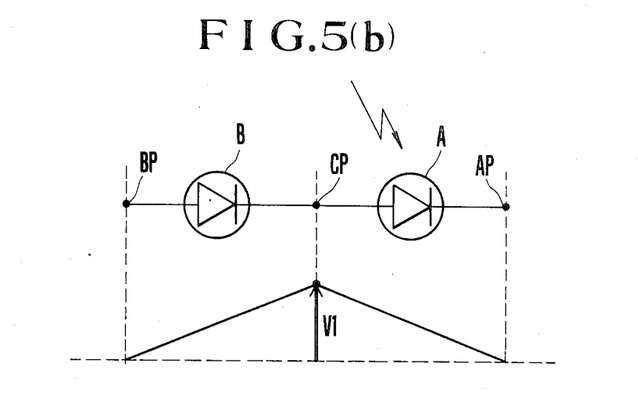
Figure 6A:
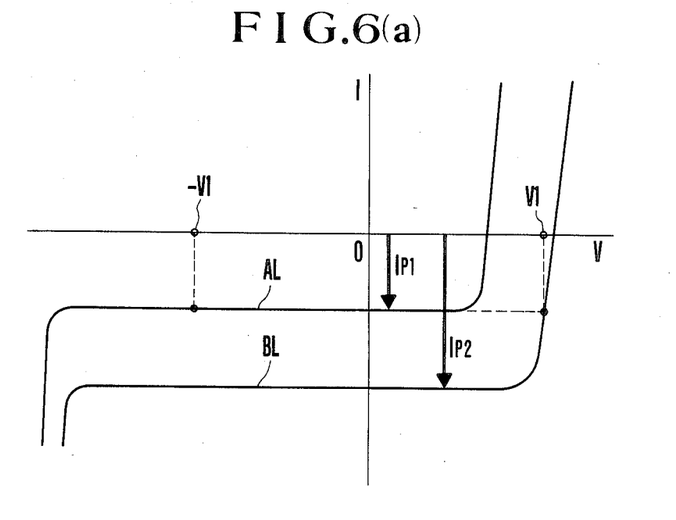
Figure 6B:
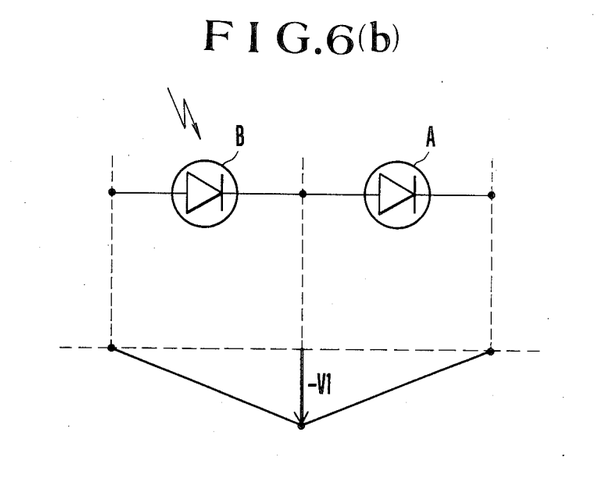

The operational amplifier OP1 operates as follows: FIGS. 5(a) and 6(a) show the relation of the photo current I of the elements A and B to a bias voltage V. FIGS. 5(b) and 6(b) show the bias voltage impressed on the elements A and B. Assuming that the elements A, E and C of the photo-electric conversion part SP are receiving the sky light as shown in FIG. 3(a), a current flowing through the series circuit of the elements A and B becomes as follows: Since the elements A and B are series connected between the input terminals of the operational amplifier OP1 while the operational amplifier OP1 is arranged to have negative feedback via the diode LD as shown in FIG. 4, the voltage between the input terminals of the operational amplifier OP1 becomes almost equal. Therefore, the terminals AP and BP of the elements A and B have the same potential as shown in FIG. 5(b). Assuming that the zero bias voltage is impressed on the elements A and B, the value of the photo current AL generated at the element A becomes Ip2 which is larger than the value Ip1 of the photo current BL generated at the element B as shown in FIG. 5(a), because the element A receives the sky light. However, since the elements A and B are series connected while the operational amplifier OP1 has the negative feedback, the currents flowing through these elements A and B are equalized with the photo current generating at the element A restricted by the value Ip1 of the photo current generating at the element B. Therefore, a forward bias V1 is automatically impressed on the element A as shown in FIG. 5(a). Since the terminals AP and BP are at the same potential, a reverse bias is automatically impressed on the element B. However, since a dark current which is produced with a reverse bias applied to the elements A and B is small, the value Ip1 of the photo current is about the same as a value obtainable under a zero bias condition.

Whereas, in case that the quantity of light incident upon the element B is larger than that of light incident upon the element A as shown in FIGS. 6(a) and 6(b), the element B is forwardly biased by a voltage V1 and the photo current BL generating at the element B is limited to the value Ip1 while the element A is reversely biased by the voltage V1.

With the elements A and B connected in series, the photo current generated by the whole series circuit is thus limited by the photo current generated at the element receiving a less quantity of light. Therefore, in case that the light of a sky comes to the element A of the photo-electric conversion part SP thus causing the element A to receive a larger quantity of light incident thereon than the other element B, the above-stated arrangement effectively prevents any adverse effect of light incident from the sky, so that an object can be photographed with a proper exposure.

Further, in this embodiment, each of the pairs of photo-electric conversion elements A and B, C and D, E and F and G and H are symmetrically arranged relative to the middle element K and are series connected with each other as described in the foregoing. One element of each pair receives light from the sky while the other of the pair received light from the ground irrespective as to whether the camera is held in a longitudinal posture or in a lateral posture, so that the adverse effect of the light of the sky can be avoided by utilizing the characteristic of the photovoltaic type photo-electric conversion element.

The same advantageous effect also obtains where an object of extremely high brightness occupies a part of a picture plane.

Figure 7A:
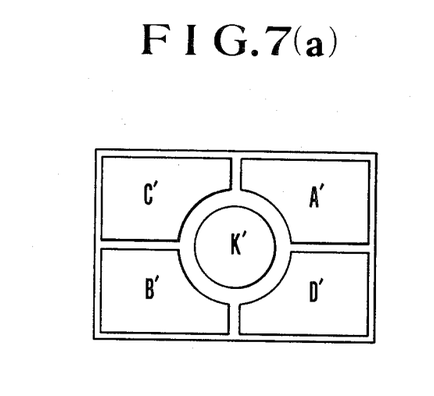
FIGS. 7(a), 7(b) and 8 show another embodiment of the invention, FIG. 7(a) showing the details of a photo-electric conversion element shown in FIG. 2, FIG. 7(b) showing the same conversion element as in a vertical posture and FIG. 8 showing in a circuit diagram a photometric circuit using the photo-electric conversion element shown in FIGS. 7(a) and 7(b).
Figure 7B:
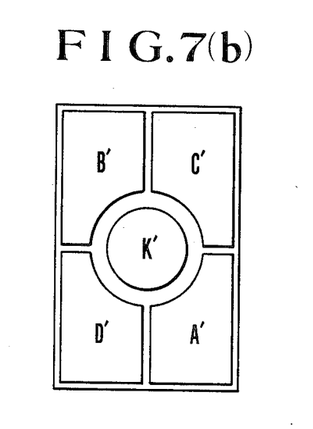
Figure 8:
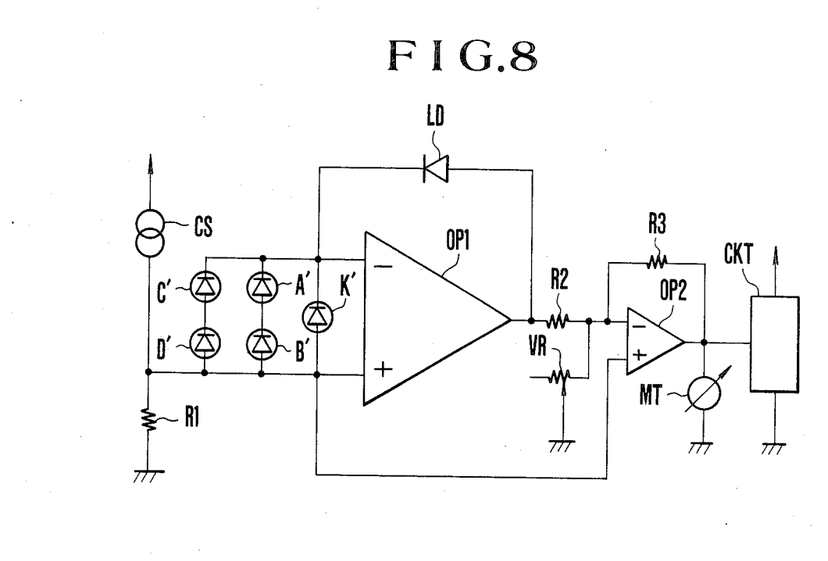

FIGS. 7(a), 7(b) and 8 show another embodiment of this invention. In FIG. 8, the same circuit elements as those shown in FIG. 4 are indicated by the same reference symbols and details of them are omitted from the following description. Referring to FIGS. 7(a) and 7(b), the photo-electric conversion part SP is divided into five elements in this embodiment. FIG. 7(a) shows the part SP as in a condition obtained with the camera held in a lateral posture and FIG. 7(b) shows it as in a condition obtained with the camera held in a vertical posture. A photo-electric conversion element K' is located in the middle of the part SP to measure the light of a main object to be photographed. Other photo-electric conversion elements A'-D' are located in the peripheral portion of the part SP to measure the light of objects located in the peripheral portion of a picture plane. The element A' is connected in series with the element B' and the element C' in series with the element D'. These pairs of elements are connected in parallel with the middle element K'. This arrangement of the photo-electric conversion part SP eliminates the adverse effects of a sky and a high brightness spot in the same manner as the preceding embodiment shown in FIGS. 3(a) and 3(b). FIG. 8 is a circuit diagram showing a photometric circuit using the photo-electric conversion elements shown in FIG. 7(a) and 7(b). This photometric circuit operates in the same manner as the circuit shown in FIG. 4. In this specific embodiment, the invention is applied to a single-lens reflex camera. However, the same advantageous effect is obtainable with the invention applied to cameras of other types, such as a lens shutter camera, etc. Further, with the photo-electric conversion part SP divided into the elements A'-D' and K' as shown in FIGS. 7(a) and 7(b), light measurement in a center preponderant averaging mode becomes impossible and has to be performed in a mere averaging mode as the picture plane of an object is covered by the whole conversion part SP even with the output currents of elements A'-D' and K' added up.

Figure 9:
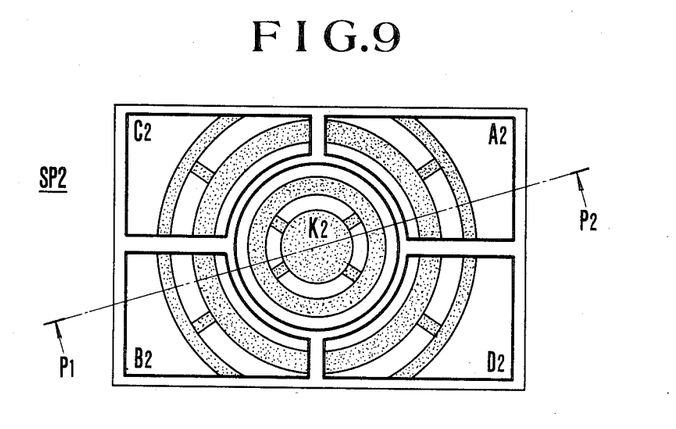
FIG. 9 shows, as another embodiment, the details of the light receiving part of the photo-electric conversion element shown in FIG. 2.

FIG. 9 shows another example SP2 of the photo-electric conversion part which solves the above-stated problem. In this case, a middle element K2 is disposed in the middle of the picture plane in the same manner as in the case of the photo-electric conversion part SP of FIGS. 7(a) and 7(b) with other elements A2, B2, C2 and D2 disposed around the middle element K2. These elements K2, A2, B2, C2 and D2 are arranged to separately weight light measurement within each of them with the effective photo sensitivity of the central portion of each of them arranged to gradually decrease in the peripheral portion within each of them. Light measurement information is thus obtainable in higher accuracy by computing the outputs of these elements.

Figure 10:
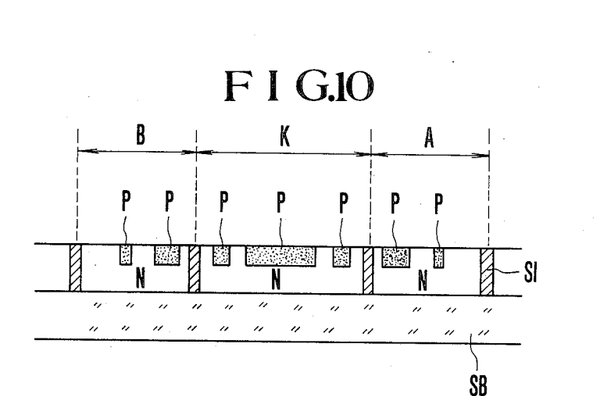
FIG. 10 is a sectional view of the same photo-electric conversion element of FIG. 9 as taken on line P1-P2 of FIG. 9.

To ensure the same accuracy of exposure with the camera held either in the lateral or vertical posture, the effective photo sensitivity portions of elements K2, A2, B2, C2 and D2 are symmetrically arranged relative to the center of the whole part SP2 as shown in FIG. 9. FIG. 10 is a sectional view taken on line P1-P2 of FIG. 9 to show by way of example the structural arrangement of the photo-electric conversion elements of FIG. 9.

Referring to FIG. 10, the illustration includes a substrate SB of a high resistance; element separating areas SI; and areas N and P. Junction parts between the areas N and the areas P represent effective photo sensitive portions, which can be formed in any desired manner in accordance with some suitable integrated circuit forming process. Photo currents generated at the photo sensitive portions of these elements are collected and produced to the outside via electrodes (not shown).

Figure 11:
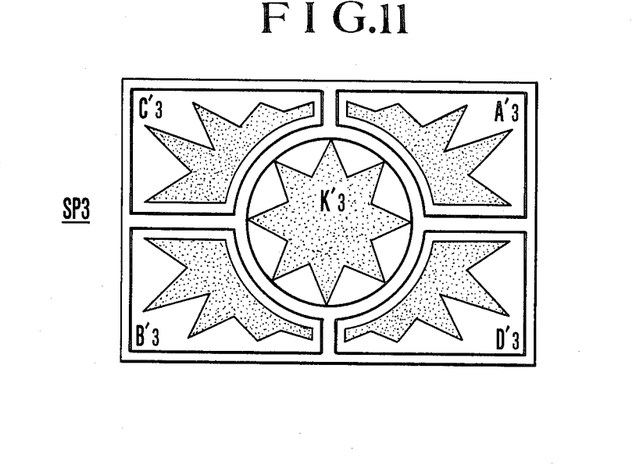
FIG. 11 shows, as a further embodiment, the details of the light receiving part of the photo-electric conversion element shown in FIG. 2.

FIG. 11 shows a further example of the photo-electric conversion part divided into five elements. While the effective photo sensitive portions of the photo-electric conversion part SP2 shown in FIG. 9 are arranged in a concentric manner, those of this photo-electric conversion part SP3 are arranged in a star-like manner.

The areas of the junction parts between the areas P and N are variously arranged within each of separated elements in this embodiment. However, it is possible to form elements equivalent to them by forming a PN junction area to form a photo sensitive area covering the whole photo-electric conversion area of each separated element and then to shield from light the photo sensitive area with some suitable material such as Al except necessary portions.

Further, for the photo-electric conversion part SP2 or SP3 shown in FIG. 9 or 11, the photometric circuit of FIG. 8 is usable. However, it is also possible to use a generally employed known photometric circuit for each of the photo-electric conversion parts shown in FIGS. 9 and 11. An example of this is as shown in FIG. 12.

Figure 12:
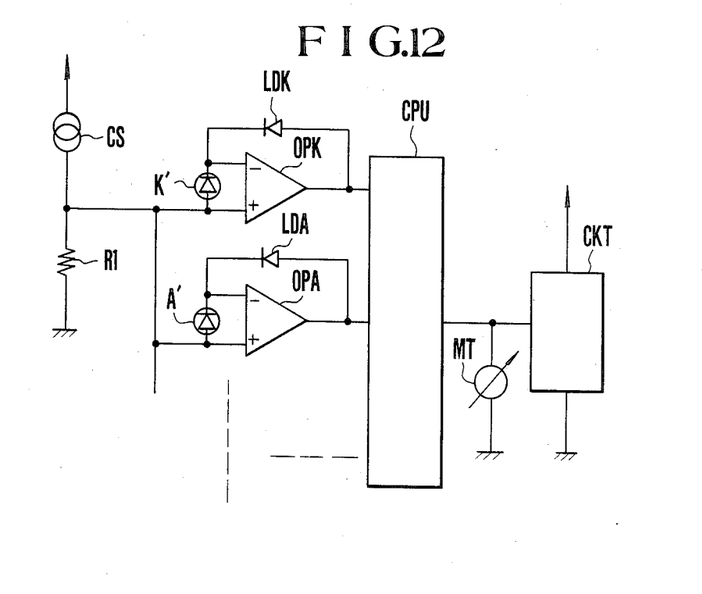
FIG. 12 is a circuit diagram showing a photometric circuit arranged to be used in combination with the photo-electric conversion element shown in FIG. 9 or 11.

Referring to FIG. 12, this photometric circuit includes operational amplifiers OPK, OPA, OPB, OPC and OPD which are arranged for the photo-electric conversion elements K2, A2, B2, C2 and D2 respectively. The same circuit elements as those shown in FIG. 8 are indicated by the same reference symbols. The photo currents produced from the photo-electric conversion elements K2, A2, --- are logarithmically compressed by the operational amplifiers OPK, OPA, --- and logarithmic compression elements LDK, LDA, ---. The logarithmically compressed currents thus obtained are computed at an information computing circuit CPU according to a predetermined algorithm to obtain information on the shutter time or the aperture.

Light measurement can be carried out in the center preponderant averaging mode in accordance with the arrangement of the photo-electric conversion parts shown in FIGS. 9, 10 and 11.

As described in the foregoing, in accordance with this invention, the probability of having a proper exposure can be greatly increased even under unfavorable conditions such as the adverse effects of high brightness skies and high contrast objects irrespective as to whether the camera is held in a lateral or vertical posture.

What is claimed is:

1. A photometric circuit for a camera having an angle of view with a middle part and a peripheral portion divided into parts, comprising:
   (a) a first photovoltaic type photoelectric conversion element arranged to measure light of the middle part of the angle of view of the camera;

(b) a plurality of photovoltaic type photoelectric conversion elements arranged to measure light of said parts of the peripheral portion of the angle of view and which is not measured by the first element;

(c) an operational amplifier having at least two input terminals, at least two pairs of light receiving elements connected in parallel between said input terminals of said amplifier, the light receiving elements in each pair including at least two photoelectric conversion elements of said plurality of photoelectric conversion elements which measure the light of said peripheral portion, and said at least two photoelectric conversion elements constituting said light receiving elements being connected in series, the series connected elements in each pair of light receiving elements being placed at positions sandwiching a central portion of the angle of view of the camera, said first photovoltaic type photoelectric conversion element being connected between the input terminals of said operational amplifier in parallel to the series connections of said at least two photoelectric conversion elements; and (d) feedback means coupled between an output terminal of said operational amplifier and and one of the input terminals of said operational amplifier.

2. A photometric circuit of a camera having an angle of view with a middle part and a peripheral portion divided into parts, comprising:

(a) a plurality of photoelectric conversion elements, each being arranged to measure light of said parts of the peripheral portion of the angle of view of said camera;

(b) an operational amplifier having at least two input terminals, said amplifier having at least two pairs of light receiving elements connected in parallel between input terminals of the amplifier, the light receiving elements of each one of said pairs including at least two photoelectric conversion elements of said plurality of photoelectric conversion elements which measure the light of said peripheral portion, said at least two photoelectric conversion elements of said light receiving elements being connected in series, the series connected elements in each pair of light receiving elements being placed at positions sandwiching a central portion of the angle of view of the camera; and (c) feedback means coupled between an output terminal of said operational amplifier and one of the two input terminals of said operational amplifier.

3. A photometric circuit according to claim 2, wherein, of said plurality of photoelectric conversion elements, the series circuit formed by said pair of elements which are approximately symmetrically disposed relative to the central portion of the angle of view of the camera is arranged in a plural number; and the plural number of series circuits are connected in parallel with each other between the input terminals of said operational amplifier.

4. A photometric circuit of a camera according to claim 2, wherein said photoelectric conversion elements consist of semiconductors of P type and N type and a junction area between the P type and the N type in each element is gradually made smaller as it is apart from the central portion of the angle of view.

5. A photometric circuit of a camera according to claim 4, wherein an effective photosensitive portion of each photoelectric conversion element is so as to be gradually reduced as it is apart from the central portion of angle of view.

6. A photometric photoelectric conversion part for a camera according to claim 4, wherein the junction area of the P type and of the N type in eaoh element forms a symmetrical shape with respect to the central portion of the angle of view.

7. A photometric circuit of a camera according to claim 4, wherein an effective photosensitive portion of each photoelectric conversion element is so as to be gradually reduced as it is apart from the central portion of angle of view.

8. A photometric circuit for a camera having an angle of view divided into portions comprising:

(a) a plurality of photovoltaic type photoelectric conversion elements arranged to measure light of the portions of the angle of view;

(b) an operational amplifier having at least two input terminals, said amplifier having at least two pairs of light receiving elements connected in parallel between input terminals of the amplifier, the light receiving elements in each one of said pairs including at least two photoelectric conversion elements of said plurality of photoelectric conversion elements connected in series; and (c) feedback means coupled between an output terminal of said operational amplifier and one of the two input terminals of said operational amplifier.

9. A light sensing circuit, comprising;

(a) a first photoelectric conversion element for photosensing a central part of a phototaking angle of view;

(b) a plurality of photoelectric conversion elements being arranged in a radial configuration having said first photoelectric conversion element positioned at a center of said configuration, wherein said plurality of photoelectric conversion elements are located at diagonal positions at least relative to the central part; and (c) wherein a sensitivity distribution of an effective photosensitive portion in each one of said photoelectric conversion elements positioned in said radial configuration is in a radial shape with respect to the central part of the angle of view, and is so arranged that the sensitivity thereof decreases as the distance from the central part of the angle of view increases.

* * * * *